United States Patent [19]

Christman et al.

[11] Patent Number: 4,936,399

[45] Date of Patent: Jun. 26, 1990

[54] HAND HELD WEIGHING SCALE

[76] Inventors: Richard E. Christman, 49 Van Buren Ave., Hopkins, Minn. 55343; Steven E. Baumann, 7328 Portland Ave., Richfield, Minn. 55423

[21] Appl. No.: 182,459

[22] Filed: Apr. 18, 1988

[51] Int. Cl.[5] .................... G01G 3/14; G01G 19/56
[52] U.S. Cl. .......................... 177/210 C; 177/149
[58] Field of Search ............... 177/148, 149, 210 C, 177/211

[56] References Cited

U.S. PATENT DOCUMENTS

| | | | |
|---|---|---|---|
| 3,595,329 | 7/1971 | Withnell et al. | 177/210 C |
| 4,482,022 | 11/1984 | Komoto | 177/210 C X |
| 4,561,511 | 12/1985 | Stuart | 177/210 C X |
| 4,582,152 | 4/1986 | Gibbons | 177/210 C |
| 4,660,666 | 4/1987 | Reder et al. | 177/211 |

*Primary Examiner*—George H. Miller, Jr.

[57] ABSTRACT

A scale arranged and constructed of relatively small size to be hand held and portable for use in weighing relatively light articles such as fish and the like. The scale operates on a capacitance measuring concept wherein an initial capacitance between two conductive, spaced and insulated plates is measured with a change in distance between the two plates caused by a load is measured and, through a logic circuit, converted to a digital read-out. The capacitance sensor unit for the measuring of the capacitance caused by the load includes a stationary plate and a moveable plate insulated from each other with proper leads connecting the plates to the logic circuit. The entire capacitance measuring device is provided in a sandwiched arrangement to provide a small and compact unit. The logic circuitry provides for digital readout and provides automatic zeroing.

16 Claims, 2 Drawing Sheets

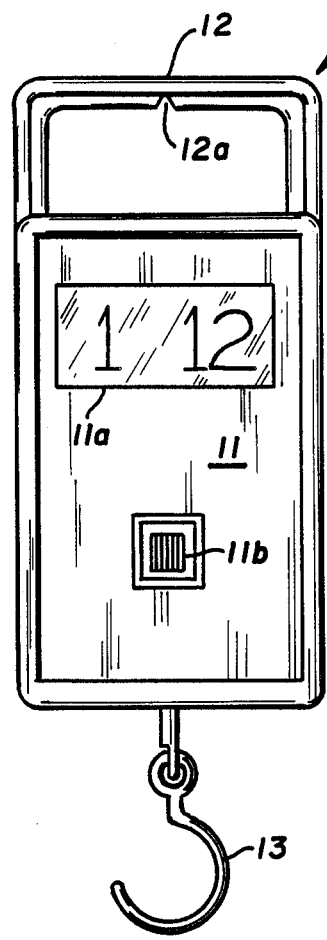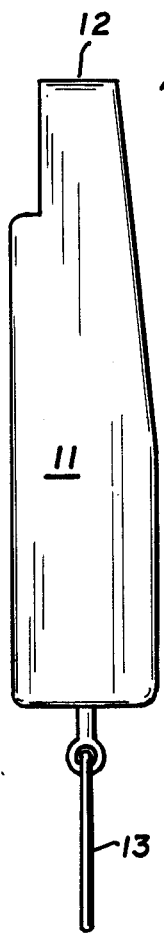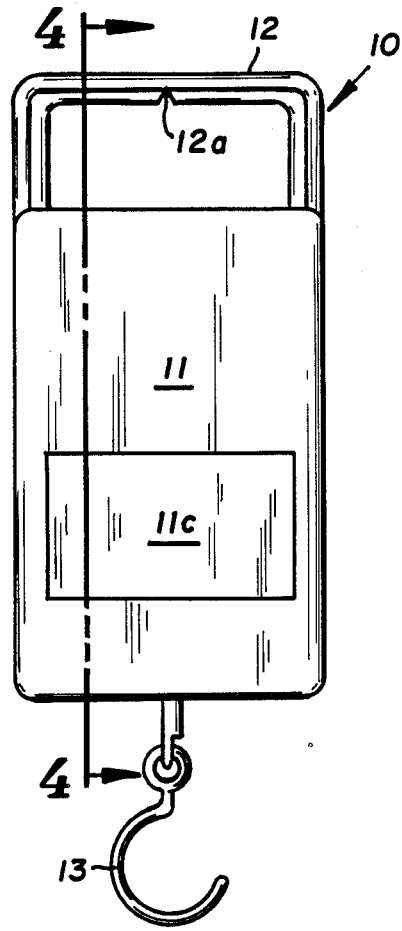
FIG.1  FIG.2  FIG.3
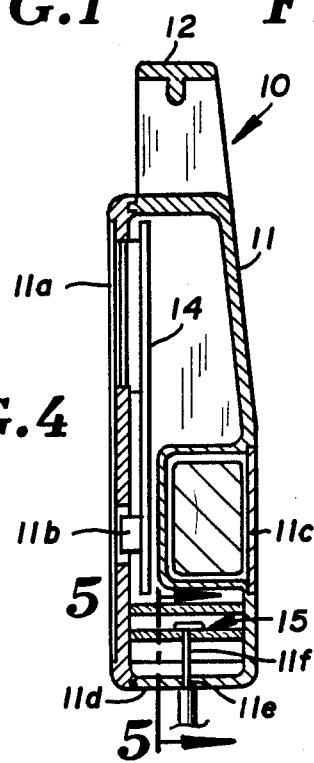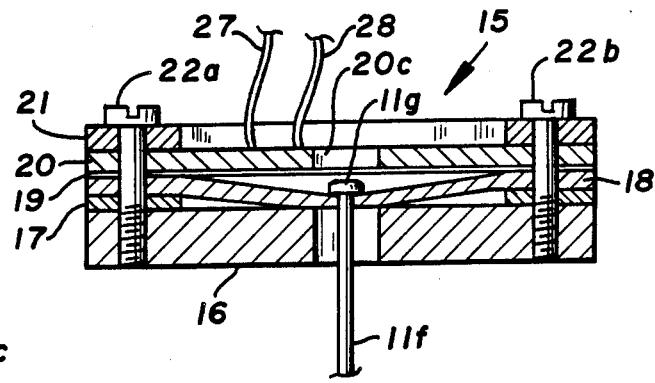
FIG.4  FIG.5

HAND HELD WEIGHING SCALE

FIELD OF THE INVENTION

This invention relates generally to scales and more particularly to a hand held portable scale which operates on a capacitance measuring concept and includes the conversion of capacitance change to a digital readout.

SHORT SUMMARY OF THE INVENTION

A portable, hand held scale particularly designed for the weighing of relatively small articles such as fish and the like with the understanding that the device disclosed herein may be made operative in ranges of weight weighings such as for example one to ten pounds, one to fifty pounds, one to one hundred pounds or various increments thereof strictly by modification of certain elements contained in the invention.

The unit includes a housing having a handle means, a power control, a digital readout area, a battery insertion and cover area and a hook element extending from the container for the attachment of the article to be weighed thereto and the capacitance measuring structure. The housing is constructed to be relatively dust and water proof.

The primary consideration of the invention is the capacitance sensing sandwich. A rigid bottom plate is provided upon which are stacked a stress limiting plate, a moveable plate member to which the weight carrying hook is attached, an insulating layer, and a second, stationary capacitance plate with the underside thereof being of conductive material and the upper side thereof having lead connecting areas and circuit completing areas thereon and finally, a clamp plate for clamping the entire sandwich, through fastening elements to the bottom plate. The clamping plate is particularly formed to prevent shifting of the sandwich plates and to provide the circuit continuity required for measuring the capacitance change due to increases in distance between the first and second capacitive plates.

The logic circuit registers zero on the digital readout when no weight is placed on the hook. Upon the placement of weight upon the hook the first, moveable plate will be deflected downwardly and the resulting increase in distance between the first and second plate results in a new capacitance reading. The provided logic circuit converts this new capacitance reading to a signal delivered to a digital readout format.

The logic circuit is selected for linear response to the changes in capacitance to afford an accurate reading of the article being weighed.

BACKGROUND AND OBJECTS OF THE INVENTION

Although applicants' scale may be utilized in many situations when portability and hand useage are required the advent of tournament and other fishing contests has resulted in a demand for an accurate and also readable and, on occasion a photographable scale. Spring loaded scales, strain gauge scales and other similar load cell scales have proved to be ineffective and expensive. The applicants' device provides a relatively inexpensive unit which measures the capacitance between two plates of known area and known beginning spacing and utilizing the dielectric constant of air to determine the initial capacitance at unweighted levels and the increase in capacitance upon loading thereof.

In their search of the prior art the applicants have found several United States Patents pertaining to capacitive loading and weighing situations. These include the Patents to Harrington, et al, No. 4,629,019; Jeffrey, No. 4,520,885; Inoue, No. 4,586,576; Harrington, et al, No. 4,585,082; and Bovee, No. 4,679,643.

First, it appears that none of these scales are applicable in any manner to hand held or portable useage. Further, none of these patents provide a simple sandwich structure incorporating a stationary and a moveable beam, moveable in response to weight placed on the moveable beam for the changing of capacitance of the air gap between itself and the stationary plate and none of these patents consider the concept of digital readout arrangements.

It is therefore an object of the applicants' invention to provide a hand held, portable scale for weighing a range of articles which includes a capacitance measuring structure incorporating a stationary plate and a weightable, moveable plate with provided circuitry to measure the capacitance increase upon movement of the moveable plate with means of converting this capacitance change to a digital readout.

It is still a further object of the applicants' invention to provide a portable, hand held scale particularly oriented to the weighing of relatively small objects, possibly under one hundred pounds wherein a stationary plate is provided and a second plate having a moveable portion is provided in spaced relation to the stationary plate with means for attaching a weight to the moveable section of the plate whereby the capacitance controlled by the distance between the stationary and moveable plate is modified in accordance with the weight and circuitry means are provided to measure the increase in capacitance due to the weight and conversion means are provided to provide the user a digital readout of the capacitance change through actual weight readout.

It is a further object of the applicants' invention to provide a portable, hand held scale which operates on a capacitance change which capacitance change is a result of a weight placed on a hook which extends through the case of the unit and is physically attached to a moveable capacitance plate.

DESCRIPTION OF THE DRAWINGS

FIG. 1 is a front elevation view of the weighing scale which embodies the concepts of the applicants + invention;

FIG. 2 is a side elevation thereof;

FIG. 3 is a rear elevation thereof;

FIG. 4 is a vertical section substantially along line 4—4 of FIG. 3;

FIG. 5 is a vertical section taken substantially along line 5—5 of FIG. 4 illustrating the capacitance measuring sandwich of the applicants' invention;

DESCRIPTION OF A PREFERRED FORM OF THE INVENTION

Figure 6:
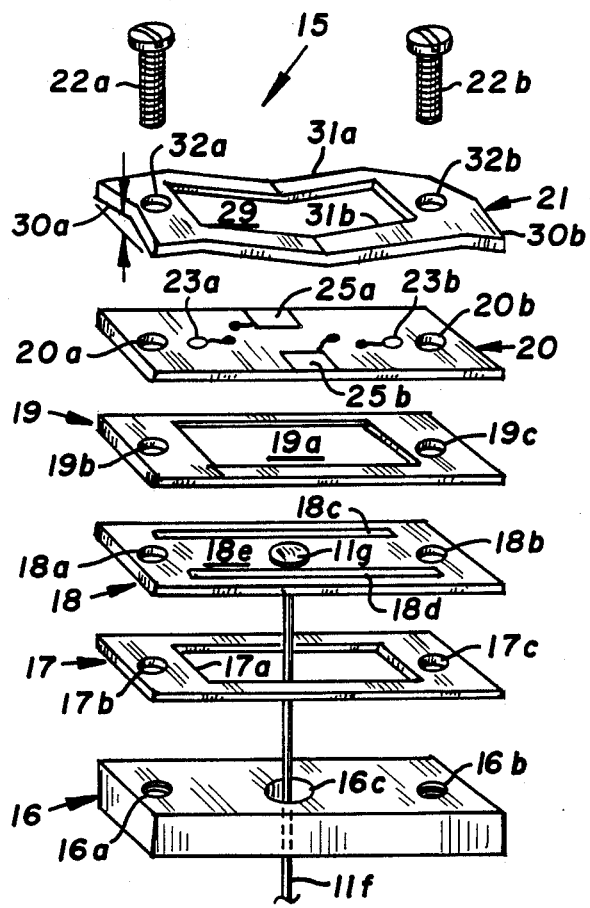
FIG. 6 is an exploded view of the capacitance measuring sandwich.

In accordance with the accompanying drawings the hand held scale embodying the concepts of the applicants' invention is generally designated 10 and a selected exterior configuration therefore is illustrated in FIGS. 1, 2 and 3.

In the form shown, the exterior housing configuration of the unit 10 provides the circuitry and battery housing portion 11, the handle portion 12 and the extending hook portion 13. Circuitry housing section 11 includes a digital readout area 11a of sufficient size for ease of reading and possibly making a photographic record, an off-on switch 11b and a battery access cover 11c. Handle portion 12 simply provides a hand gripping area and, as illustrated, a notch 12a may be formed therein for hanging the entire unit 10 onto a supporting object. Hook member 13 is simply illustrated as a hook to which the article to be weighed is attached. It should be obvious that the housing may take various configurations without departing from the scope of the invention.

As illustrated in the cross section of FIG. 4 the bottom surface 11d of the housing provides a passage 11e therethrough for passage of the hook and attaching link 11f therethrough. This passage may be provided with packing which permits movement of linkage 11f. As also illustrated in FIG. 4, circuit board and logic circuit 14 is housed in the interior of the unit 10.

The operative capacitance sensor is illustrated in cross section in FIG. 5 and is designated in its entirety 15. As illustrated in FIG. 4 this sensor unit 15 is housed in the lowermost portion of the housing 10 and the container sections are arranged to positively hold the same at such lower portion thereof.

Sensor portion 15 is illustrated in cross section in FIG. 5 and is illustrated in exploded form in FIG. 6 with certain elements thereof illustrated in FIGS. 7 through 10.

As illustrated in these views the sensor 15 provides a sandwich construction including a plurality of stacked plates. These plates include a base plate 16, a stress limiting plate 17, a first capacitance plate 18, an insulating layer or plate 19, a stationary second capacitance plate 20, a clamping plate 21 and fastening elements 22a-22b which will pass through apertures in the various plates and are received, in the form shown, in threaded apertures 16a-16b in base plate 16.

Base plate 16 in addition to providing the threaded apertures 16a-16b also provides a central passage 16c therethrough for passage of connector 11f to the hook 13. Limiting plate 17 is provided with a centrally arranged, generally rectangular passage 17a as well as fastener apertures 17b-17c. The purpose of this particular plate is to limit the moveable portion 18e of the first capacitor plate 18 such that the same will not become overstressed and therefore deformed. Bending of the selected section 18e of the capacitance plate 18 due to the weight placed on the hook 13 could possibly extend plate 18 over its elastic limit and therefore not allow the same to elastically rebound to a zero loading and readout situation.

The capacitance plate 18 includes fastener passages 18a-18b and also includes a pair of parallel slots 18c-18d extending the greater dimension of the plate 18. The purpose of these slots is to provide a moveable interior section 18e to which the connector 11f for hook 13 is attached. As illustrated in FIGS. 5 and 6, the connector 11f is provided with an enlarged head section 11g to provide an abutment and connective arrangement between the hook 13 and the moveable plate section 18e. When an article is placed on hook 13 the weight thereof is transferred onto the moveable section 18e of plate 18 and will pull the same downwardly to result in an increased distance between this capacitance plate 18 and the stationary capacitance plate 20.

Plates 16, 17, 18 are all of conductive materials for satisfaction of curcuitry completion as will be described hereinafter.

Plate 19 is an insulating layer plate to provide insulation between the moveable capacitance plate 18 and stationary capacitance plate 20. This plate or layer includes a rectangular opening 19a and fastener passages 19b-19c. The rectangular opening 19a provides the communicative area between the stationary 20 and moveable 18 capacitance plates. As is known, the capacitance between two parallel plates is given by the equation: $C = 0.2235 \, KA/d$. The terms in here are defined as follows:

C = capacitance in picofareds

K = dielectric constant of air (1.00059 at room temperature)

A = area of plates, sq. in.

d = distance between plates, inches.

The A factor is determined by the size of the rectangular opening 19a of the insulator layer or plate 19.

Figure 10:
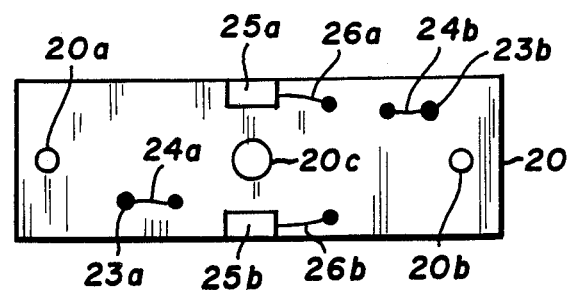
FIG. 10 is a top plan view of the stationary capacitance plate.
Figure 11:
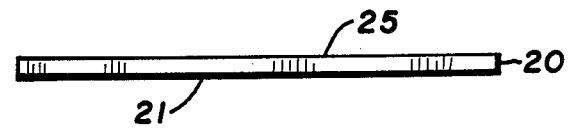
FIG. 11 is a side elevation thereof.
Figure 12:
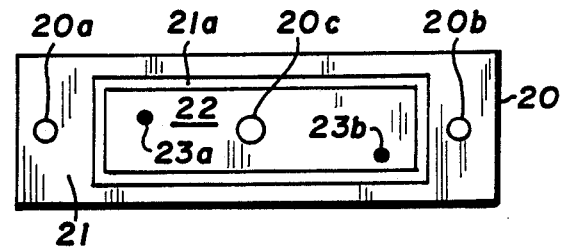
FIG. 12 is a bottom plan view thereof.

The stationary capacitance plate 20 is particularly illustrated in FIGS. 10-12. Plate 20 consists of, in the form shown, a circuit board, initially coated or plated on both sides and thereafter etched on both sides to provide the circuitry configuration necessary in the operation of the unit.

As best illustrated in FIGS. 10-12, plate 20 is provided with fastener passages 20a-20b and a central passage 20c. This central passage is only necessary if the head 11g of connector 11f would normally contact any portion of the plated underside 21 of the plate 20 when the moveable plate 18 is in its rest or unloaded condition.

The underside or bottom of plate 20 is particularly illustrated in FIG. 12. As illustrated therein the entire underside of the plate is coated with a conductive material and a portion thereof 21a defines an etched rectangle to provide an isolated area 22 of conductivity serving as the capacitance defining area through the insulated layer opening 19a and communicating with moveable capacitance plate 18.

The upper side of plate 20 is illustrated in FIG. 10. This upper side provides unetched areas which accommodate the leads to the logic circuit. Applicants have found that by providing mere image of lead attachment locations that an ease of placement of the various plates of the capacitance sandwich is obtained as plate 20 is operative and functional no matter which way it is placed into the stack with obviously the bottom and top being properly oriented.

As illustrated in FIG. 10 the unetched areas include plated through passages 23a-23b which then provide electrical connection to the bottom capacitance area 22 with lead and solder areas 24a-24b electrically arranged therewith but spaced from the plated passages 23a-23b.

Second circuit completion areas include unetched block areas 25a-25b with again, solder lead areas 26a-26b spaced therefrom. These block areas 25a-25b also serve a function in connection with the upper clamp plate 21 as described hereinafter. With the structure of plate 20 it should be obvious that the leads 27-28 to the logic circuit are easily accessible at a common area to provide simplicity of connections between the logic circuit and the sensor.

Figure 7:
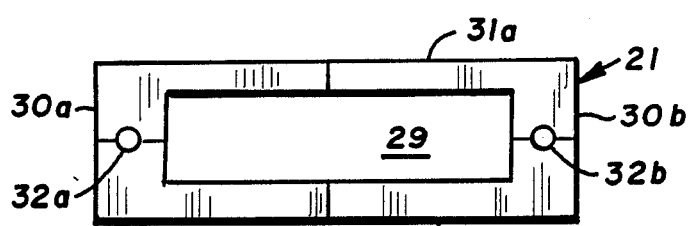
FIG. 7 is a top plan view of the uppermost clamp plate of the capacitance measuring sandwich.
Figure 8:
FIG. 8 is a side view of the clamp plate.
Figure 9:
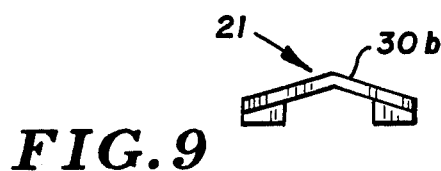
FIG. 9 is an end view thereof.

Upper clamp plate 21 is particularly illustrated in FIGS. 7, 8 and 9. Again, this plate is of rectangular configuration with a rectangular opening 29 generally centrally thereof to provide end, stiles, sections 30a-30b and side rails 31a-31b. Fastener passages 32a-32b are provided in such end, stiles, sections and are obviously aligned for joining all of the plates together through fastening elements 22a-22b to the aforementioned bottom or base plate 16.

As illustrated in FIG. 9 the end, stile, sections 30a-30b are formed or bent to elevate the central fastening area thereof. In addition the side, rails 31a-31b are formed or bent downwardly at the longitudinal centers thereof and these respective formed centers of the rails will contact the aforementioned unetched blocks 25a-25b on the upper surface of plate 20. Clamping plate 21 is specifically formed with the bend areas on the stiles and rails to provide a positive arrangement for insuring flatness of all of the intermediate plates when the fastening elements 22a-22b are tightened into the threaded aperture 16a-16b of the lower plate 16. If the clamping plate 21 were initially, simply a flat plate, tightening the fastening elements 22a-22b could result in distortion thereof and result in the center areas of the plates not necessarily being in positive adjacent contact position to block 25a-25b.

It should be noted that the conductivity for the circuit completion is obtained through the continuity of contact of the first, moveable capacitance plate 18, the stress plate 17 and the bottom plate 16 and upwardly to the clamp plate 21 through the attachment screws 22a-22b and, as the clamping plate 21 is also conductive the circuit is completed by the positive contact of the bent rail L. areas against the respective blocks 25a-25b on plate 20. With this particular construction the applicants insure positive circuitry completion and proper clamping of the entire sandwich.

The completed capacitance measuring sandwich is illustrated in FIG. 5 and it should be noted that this unit is extremely compact and operative as a totally independent unit with only the leads 27-28 extending therefrom to the logic circuit 14.

Figure 13:
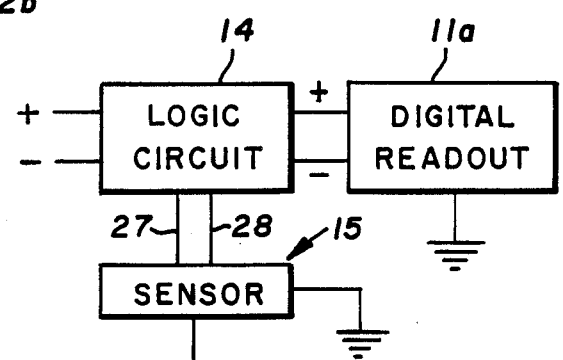
FIG. 13 is a schematic diagram of the electrical circuitry of the unit.

The unit in its completed and closed form is shown in cross section in FIG. 4 and the circuitry of the entire unit is illustrated in FIG. 13.

The logic circuit is simply a circuit for converting the capacitance readouts into the desired digital readout and to screen 11a. The logic circuit may take many forms and may include many situations. For example pounds and ounces are illustrated but this can be related to grams and kilograms with provision of a conversion factor and readout modification. The logic circuit provides, through one of many known means, control of linearity for correlation of the capacitance changes in a linear fashion. The logic circuit may also include other well known electronic components which would include automatic zeroing or tare weight zeroing. Tare weight zeroing would be applicable if the article to be weighed were to be placed on a scale pan which is initially attached to the hook 13 with the article to be weighed placed in the pan. This would require a zeroing function to the circuit in which, after the pan is placed on the hook a zero reading would be provided and the reading resulting thereafter would eliminate the weight of the pan.

Many of these electronic components are readily available in the art and it is not necessary that the applicants explain or particularly disclose any one of the arrangements utilized.

The use of the invention should be obvious. When weighing fish it is simply necessary to turn the switch to its on position and place the fish on the hook. The result of the weight of the fish is read through the digital screen. Obviously, in weighing a fish a dampening effect of a dampener unit may be introduced into the logic circuit to eliminate wiggling of the fish. Obviously this is not necessary if the load is static.

The advantages of the applicants' invention should be obvious. A digital readout is provided of sufficient size to enable easy viewing or even photography thereof when the person using the same may be involved in a "catch and release tournament". The scale is relatively impervious to dust, humidity and the like and the unit itself, particularly the sensor sandwich is compact and easily replaced simply by disconnecting the two leads 27-28 from the logic circuit 14. It should also be understood that the particular sandwich illustrated may be utilized in ranges of weights and a variety of scales could be provided to measure, for example zero to ten pounds, zero to twenty-five pounds and various other increments. This incremental arrangement is attainable by increasing either the area of exposure between the plates 18, 20 by increasing or decreasing the area of opening 19a in insulating layer 19 or by increasing or decreasing the thickness of layer 19 to increase the "d" factor of the equation.

It should be obvious that the applicants have provided a new and unique scale for weighing relatively small articles which is hand held and portable and will provide an accurate reading and display of the weight placed thereon.

What is claimed is:

1. A hand held, portable scale including:
  a. a housing providing a substantially sealed interior for housing the scale components and having a portion thereof formed to provide a handle for holding the same;
  b. a logic circuit arranged within said cavity;
  c. means for energizing said circuit including a power source arranged within said housing;
  d. readout means including digital readout facility connected to said logic circuit and arranged and constructed to be readable exteriorally of said housing;
  e. capacitance measuring means arranged within said cavity and connected to said logic circuit for the transmission of a signal to said logic circuit, said signal being generated in response to changes in capacitance thereof;
  f. said capacitance measuring and signal generating means including:
    1. a first plate member having at least one conductive side and having a movable portion;
    2. a second plate member having at least one conductive side;
    3. means for retaining said second plate member in stationary position with respect to said moveable portion of said first plate;

4. said conductive sides of said first and second plate members being arranged in spaced, face-to-face relation;

g. means for connecting a weight to be measured to said capacitance measuring means, said means extending through the housing whereby the connected weight provides a capacitance change signal transmitted to said logic circuit from said measuring means and said logic circuit converting said signal to said digital readout means;

i. said weight connecting means being attached to said moveable portion of said first plate whereby placing of a weight upon said connecting means will increase the distance between said conductive first and second surfaces of said plate members.

2. The hand held, portable scale as set forth in claim 1 and an insulating plate member interposed between said first and second conductive plate surfaces.

3. The hand held, portable scale as set forth in claim 2 and the thickness of said insulating plate member is selectively variable whereby the initial capacitance between said first and second conductive plate surfaces may be determined and controlled.

4. The hand held, portable scale as set forth in claim 2 and said insulating plate member having a passage therethrough which passage provides the area of effective exposure of the conductive surfaces of said first and second plate conductive sides to determine and control the initial capacitance between said plates.

5. The hand held, portable scale as set forth in claim 4 and said insulating plate member passage area is selectively variable.

6. The hand held, portable scale as set forth in claim 2, said capacitance measuring means including:
a. a base plate having a passage centrally for the movement of the weight connecting means there through;
b. said first plate member received on the upper surface of said base plate;
c. said insulating plate member overlying said first plate member;
d. said second plate member overlying said insulating plate member;
e. a clamp plate overlying said second plate member; and,
f. clamp means extending from said base plate to said clamp plate for combining and clamping all of said plates into a compact sandwich construction.

7. The hand held, portable scale as set forth in claim 6 means for limiting the movement of said moveable portion of said first plate interposed between said first plate and said base plate.

8. The hand held, portable scale as set forth in claim 7 and said movement limiting means including a plate member having a central passage of a size to receive said moveable portion of said first plate therethrough to move, in its extreme position to abut with said base plate, the thickness of said movement limiting plate being determined to prevent overstressing of said first plate through extended movement.

9. The hand held, portable scale as set forth in claim 6 and circuit means delivering said capacitance signal from said sandwich to said logic circuit including:
a. a first electrical lead extending from said conductive side of said first plate to said logic circuit; and,
b. a second electrical lead extending from said conductive side of said second plate to said logic circuit.

10. The hand held, portable scale as set forth in claim 9 and said first plate having said moveable portion, said movement limiting means and said base plate all being of conductive material whereby said first electrical lead is electrically connectable to any one of said plates.

11. The hand held, portable scale as set forth in claim 10 and said clamp means being of electrically conductive material to provide electrical connection from one of said moveable, limiting and base plate to said clamp plate for connection to said logic circuit.

12. The hand held, portable scale as set forth in 11 and:
a. said second plate being of a non-conductive material and being plated with electrically conductive material on one side thereof to provide said one conductive side;
b. an electrical contact provided through said second plate to provide a terminal block structure on the unplated side thereof;
c. a second terminal block provided on said unplated side of said second plate;
d. said clamp plate being formed to electrically contact said second terminal block when clamping force is applied to said formed sandwich; and,
e. electrical leads extending from said terminal and said second terminal block to said logic circuit.

13. The hand held, portable scale as set forth in claim 12 wherein all of said plates are generally rectangular and said moveable portion of said first plate is provided by a pair of parallel spaced slots formed therethrough adjacent the longer sides of said rectangular shape with the central portion thereof providing the moveable area and area of attachment of said weight connecting means.

14. The hand held, portable scale as set forth in claim 13 and said conductive area of said second plate providing a generally rectangular conductive area generally centrally of said plate.

15. The hand held, portable scale as set forth in claim 12 and;
a. said clamp plate being generally rectangular in shape and providing a generally rectangular passage therethrough providing side rails and end stiles bounding said passage;
b. said side rails being formed to provide a depressed area generally centrally of the length thereof to electrically contact said second terminal block; and
c. the clamping force provided by said clamp means is provided at said stile ends.

16. The hand held, portable scale as set forth in claim 15 and;
a. said stile portions are deformed upward generally centrally thereof; and,
b. the clamping force provided by said clamp means is provided at said deformed location.

* * * * *